(12) United States Patent  (10) Patent No.: US 9,690,394 B2
Armstrong-Muntner  (45) Date of Patent: Jun. 27, 2017

(54) INPUT DEVICE HAVING EXTENDABLE NIB

(75) Inventor: Joel S. Armstrong-Muntner, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 559 days.

(21) Appl. No.: 13/620,177

(22) Filed: Sep. 14, 2012

(65) Prior Publication Data

US 2014/0078109 A1   Mar. 20, 2014

(51) Int. Cl.
G06K 11/06 (2006.01)
G06F 3/0354 (2013.01)

(52) U.S. Cl.
CPC ...... G06F 3/03545 (2013.01); G06F 3/03542 (2013.01)

(58) Field of Classification Search
CPC ...... G06F 3/033; G06F 3/044; G06F 3/03545; G06F 3/035422; B43K 1/12; B43K 5/02; B43K 29/00; B44D 3/00
USPC ........ 178/18.06, 19.03, 18.01; 345/173, 179, 345/156; 382/314; 401/35, 195, 198; 33/18.2
See application file for complete search history.

(56) References Cited

U.S. PATENT DOCUMENTS

| 4,318,096 A | 3/1982 | Thornburg et al. |
| 4,695,680 A | 9/1987 | Kable |
| 4,761,089 A * | 8/1988 | Kurihara et al. ............. 401/198 |
| 4,814,552 A | 3/1989 | Stefik et al. |
| 4,859,080 A | 8/1989 | Titus et al. |
| 4,883,926 A | 11/1989 | Baldwin |
| 5,247,137 A | 9/1993 | Eppeerson |
| 5,434,371 A | 7/1995 | Brooks |
| 5,581,052 A | 12/1996 | Padula et al. |
| 5,600,348 A | 2/1997 | Bartholow et al. |
| 5,736,687 A | 4/1998 | Sellers |
| 5,831,601 A | 11/1998 | Vogeley et al. |
| 5,914,708 A | 6/1999 | LaGrange et al. |
| 6,050,735 A | 4/2000 | Hazzard |
| 6,081,261 A | 6/2000 | Wolff et al. |
| 6,130,666 A | 10/2000 | Persidsky |
| 6,188,392 B1 | 2/2001 | O'Connor et al. |
| 6,650,320 B1 | 11/2003 | Zimmerman |
| 6,717,073 B2 | 4/2004 | Xu et al. |
| 6,906,703 B2 | 6/2005 | Vablais et al. |
| 6,914,596 B2 * | 7/2005 | Liu et al. ...................... 345/179 |
| 6,933,933 B2 | 8/2005 | Fleming |

(Continued)

FOREIGN PATENT DOCUMENTS

| GB | 2445362 | 7/2008 |
| KR | 20030035305 | 5/2003 |

OTHER PUBLICATIONS

U.S. Appl. No. 12/683,255, Jan. 6, 2010, Pance.

(Continued)

Primary Examiner — Nicholas Lee
Assistant Examiner — Abdul-Samad A Adediran
(74) Attorney, Agent, or Firm — Zachary D. Hadd

(57) ABSTRACT

An input device for computing devices that include touch screens. The input device includes a body, a nib or tip movably coupled to the body, and an actuator operably connected to the body and the nib. The actuator moves the nib from a first position to a second position, and in the first position the input device provides a first input to the computing device and in the second position the input device provides a second input to the computing device.

18 Claims, 12 Drawing Sheets

(56) References Cited

U.S. PATENT DOCUMENTS

| | | |
|---|---|---|
| 7,027,041 B2 | 4/2006 | Nishimura et al. |
| 7,064,750 B2 | 6/2006 | Duret |
| 7,068,262 B2 | 6/2006 | Perkins et al. |
| 7,310,091 B2 | 12/2007 | Liu et al. |
| 7,322,662 B2 | 1/2008 | Bich et al. |
| 7,330,590 B2 | 2/2008 | Seto et al. |
| 7,477,242 B2 | 1/2009 | Cross et al. |
| 7,486,823 B2 | 2/2009 | Wang et al. |
| 7,489,308 B2 | 2/2009 | Blake et al. |
| 7,511,705 B2 | 3/2009 | Silk et al. |
| 7,612,767 B1 | 11/2009 | Griffin et al. |
| 7,646,379 B1 | 1/2010 | Drennan et al. |
| 7,671,837 B2 | 3/2010 | Forsblad et al. |
| 7,671,845 B2 | 3/2010 | Keely |
| 7,791,597 B2 * | 9/2010 | Silverstein .......... G06F 3/03542 345/156 |
| 7,842,893 B2 | 11/2010 | Tomiya |
| 7,976,226 B2 | 7/2011 | Jeon et al. |
| 8,023,079 B2 | 9/2011 | Chen et al. |
| 8,063,322 B2 | 11/2011 | Katsurahira |
| 8,089,474 B2 | 1/2012 | Geaghan et al. |
| 8,094,325 B2 | 1/2012 | Silverbrook |
| 8,130,212 B2 | 3/2012 | Umeda |
| 8,212,795 B2 | 7/2012 | Henry et al. |
| 8,259,090 B2 | 9/2012 | Chiang et al. |
| 2002/0067350 A1 | 6/2002 | Ben Ayed |
| 2002/0074171 A1 * | 6/2002 | Nakano .............. G06F 3/03545 178/18.01 |
| 2002/0158854 A1 | 10/2002 | Ju |
| 2002/0180714 A1 | 12/2002 | Duret |
| 2003/0118394 A1 * | 6/2003 | King et al. .................... 401/195 |
| 2003/0214490 A1 | 11/2003 | Cool |
| 2004/0140962 A1 | 7/2004 | Wang et al. |
| 2005/0057535 A1 * | 3/2005 | Liu .................... G06F 3/03545 345/179 |
| 2005/0110777 A1 | 5/2005 | Geaghan et al. |
| 2005/0110778 A1 | 5/2005 | Ben Ayed |
| 2005/0156915 A1 | 7/2005 | Fisher |
| 2005/0162411 A1 | 7/2005 | van Berkel |
| 2005/0246907 A1 * | 11/2005 | Diamond ................ B44D 3/00 33/18.2 |
| 2006/0087496 A1 | 4/2006 | Maciejewski |
| 2006/0139338 A1 | 6/2006 | Robrecht et al. |
| 2007/0076953 A1 | 4/2007 | Gonzalez et al. |
| 2007/0085842 A1 | 4/2007 | Pilu |
| 2007/0123165 A1 | 5/2007 | Sheynman et al. |
| 2007/0188477 A1 | 8/2007 | Rehm |
| 2007/0236474 A1 | 10/2007 | Ramstein |
| 2007/0285405 A1 | 12/2007 | Rehm |
| 2008/0036734 A1 | 2/2008 | Forsblad et al. |
| 2008/0150917 A1 | 6/2008 | Libbey et al. |
| 2008/0150921 A1 | 6/2008 | Robertson et al. |
| 2008/0278443 A1 | 11/2008 | Schelling et al. |
| 2008/0309621 A1 | 12/2008 | Aggarwal et al. |
| 2009/0009489 A1 | 1/2009 | Lee |
| 2009/0032313 A1 | 2/2009 | Silverbrook et al. |
| 2009/0036176 A1 | 2/2009 | Ure |
| 2009/0115431 A1 | 5/2009 | Philipp |
| 2009/0167702 A1 | 7/2009 | Nurmi |
| 2009/0236153 A1 | 9/2009 | Kyung et al. |
| 2009/0251338 A1 | 10/2009 | Marggraff et al. |
| 2009/0314552 A1 | 12/2009 | Underwood et al. |
| 2010/0006350 A1 | 1/2010 | Elias |
| 2010/0051356 A1 | 3/2010 | Stern et al. |
| 2010/0170726 A1 | 7/2010 | Yeh et al. |
| 2010/0271312 A1 | 10/2010 | Alameh et al. |
| 2010/0315384 A1 | 12/2010 | Hargreaves et al. |
| 2011/0162894 A1 | 7/2011 | Weber |
| 2011/0164000 A1 | 7/2011 | Pance |
| 2011/0221712 A1 * | 9/2011 | Liang ........................... 345/179 |
| 2011/0273376 A1 | 11/2011 | Dickinson et al. |
| 2011/0285670 A1 | 11/2011 | Li et al. |
| 2011/0291986 A1 | 12/2011 | Rebeschi et al. |
| 2012/0062497 A1 | 3/2012 | Rebeschi et al. |
| 2012/0098798 A1 * | 4/2012 | Lee ............................. 345/179 |
| 2012/0113065 A1 | 5/2012 | Chin |
| 2012/0127110 A1 | 5/2012 | Amm et al. |
| 2012/0228039 A1 * | 9/2012 | Hinson et al. ............. 178/19.03 |
| 2013/0009907 A1 | 1/2013 | Rosenberg et al. |
| 2013/0135220 A1 * | 5/2013 | Alameh et al. ............... 345/173 |
| 2014/0078070 A1 | 3/2014 | Armstrong-Muntner |

OTHER PUBLICATIONS

U.S. Appl. No. 12/683,287, Jan. 6, 2010, Weber.
U.S. Appl. No. 12/950,848, Nov. 19, 2010, Amm et al.
U.S. Appl. No. 13/620,044, Sep. 14, 2012, Armstrong-Muntner.

* cited by examiner

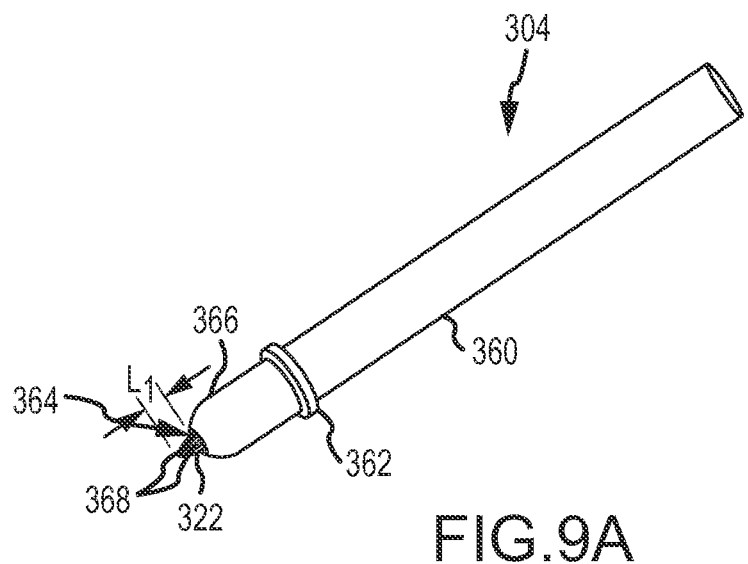
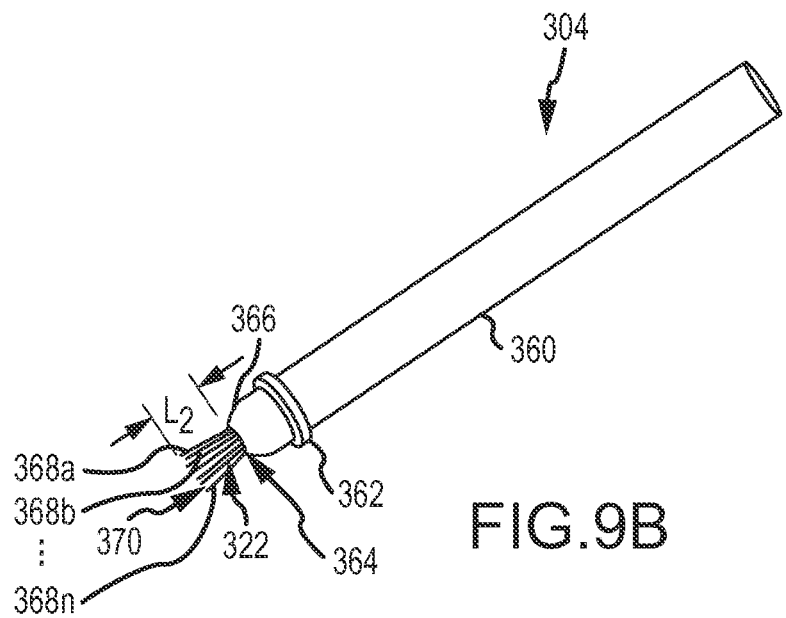

INPUT DEVICE HAVING EXTENDABLE NIB

TECHNICAL FIELD

The present invention relates generally to computing devices, and more specifically, to input devices for computing devices.

BACKGROUND

Many types of input devices may be used to provide input to computing devices, such as buttons or keys, mice, trackballs, joysticks, touch screens and the like. Touch screens, in particular, are becoming increasingly popular because of their ease and versatility of operation. Typically touch screens can include a touch sensor panel, which may be optically clear or near-clear, and a display device that can be positioned behind, in front of or in plane with the panel so that the touch-sensitive surface substantially covers the viewable area of the display device. Touch screens allow a user to provide various types of input to the computing device by touching the touch sensor panel using a finger, stylus, or other object at a location dictated by a user interface being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Touch sensor panels can be formed from a matrix of row and column traces, with sensors or touch regions present where the rows and columns cross over each other while being separated by a dielectric material. Each row can be driven by a stimulation signal, and touch locations can be identified through changes in the stimulation signal. Typically, a touch location is sensed based on an interference of the stimulation signal, such that a touch location may correspond to a location where the stimulation signal is the weakest. In some instances it may be desirable for a user to provide input to the touch screen with an input device other than the user's finger or fingers. Some input devices, such as a stylus, allow a user to use the input device as a pen or pencil and "write" on the touch screen. However, many times, a tip or point of these input devices may be a relatively hard element that may feel unnatural to users, as well as may generally produce the same output on the touch screen regardless of the user's input variation (such as, pressing harder, angling the tip, and so on). Accordingly, many of the "writing" input devices may lack features that may be present in pens, pencils, or other non-electronic writing tools.

SUMMARY

One example of the present disclosure may take the form of an input device for computing devices that include touch screens. The input device includes a body, a nib or tip movably coupled to the body, and an actuator operably connected to the body and the nib. The actuator moves the nib from a first position to a second position, and in the first position the input device provides a first input to the computing device and in the second position the input device provides a second input to the computing device.

Another example of the disclosure may take the form of a stylus for proving an input to a touch interface of a computing device. The stylus includes an elongated body, a nib movably connected to the body, and an actuator operably connected to the nib and the body. The actuator varies a length of the nib exposed outside of the body.

BRIEF DESCRIPTION OF THE DRAWINGS

FIG. 9A is a perspective view of a second example of the input device with the nib in a retracted position and having a plurality of strands.

FIG. 9B is a perspective view of the input device of FIG. 9A with the nib in an extended position.

SPECIFICATION

Overview

Figure 1:
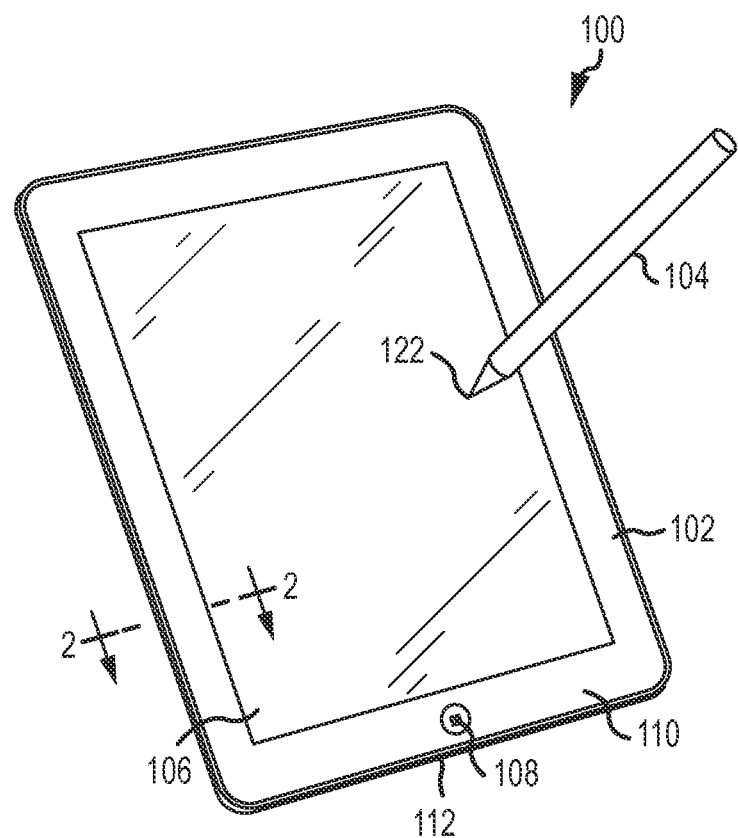
FIG. 1 is a perspective view of a system including a computing device and an input device communicating therewith.

In some embodiments herein, an input device having variable output characteristics for communicating with a computing device is disclosed. In one embodiment, the input device may take the form of a stylus that may be used to communicate with a display, such as a touch screen or touch interface, of a computing device. The stylus may include a nib or tip that may have variable interaction surface dimensions (as one example, variable lengths that may contact or be sensed by a touch-sensitive surface, such as a touch screen). In one instance, the user may vary the length of the nib exposed outside of a body of the stylus, which may vary an output of the stylus as it interacts with the touch screen. As one example, the user may activate a button, switch, or other component, in order to vary the length of the nib which may be exposed through an end of the stylus. As the length of the nib exposed varies, the point of contact or interaction dimensions of the nib on the touch screen, as well as the length of the nib encased within the body may be varied, which may vary one or more inputs from the input device to the touch screen. Moreover, in some embodiments, the nib may be at least partially flexible, such that as the exposed length varies, the signal detected by a touch-sensitive surface may vary, thereby varying an output of an associated electronic device (as may be shown on a display) and/or user interaction. For instance, a relatively short exposed length may be less flexible, resulting in a harder feel, such as a pen, tip, when the user presses on the touch screen, whereas a longer exposed length may be more flexible, resulting in a softer feel, such as a paint brush, and optionally wider tip when the user presses on the touch screen.

By increasing its exposed length or other dimension, more of the nib, which may be a conductive element, may be in communication with the touch screen. In these instances, the stylus may interact with multiple nodes of the touch screen, which may produce a wider, darker, or differently colored output, provide an output with different formatting, be registered as a different input, or otherwise vary the output of the touch screen based on the inputs from the stylus. As one example, the more portions of the nib that may be in contact with the touch screen may provide a wider displayed output line, or may correspond to different colors, or the like.

In another embodiment, the nib may include multiple (e.g., two or more) strands. In these instances, as the nib length extends from an enclosure or body of the stylus, the strands may separate from one another. As one example, the strands may fan away from one another. Each strand may interact with the touch screen to provide a separate input to the device, and so this may create a brush-like input to the touch screen. (Touch screen, as used herein, Is intended to encompass any touch-sensitive surface, and particularly those associated with a display.) As the strands may be relatively flexible, the stylus may feel substantially similar to a paint brush, and the touch screen or computing device may be configured to provide outputs that correspond to a paint brush-type input. For example, as the user swipes the stylus across the page, the interactions of each strand with the touch screen may produce a brush-like output line having varying thicknesses depending on the pressure applied by the user, the angle of the stylus, and so on.

As briefly mentioned, the nib may be a conductive material, or another material laced or coated with conductive elements, that may interact with a capacitive touch screen. As one non-limiting example, the nib may be Mylar or a like material. Alternatively or additionally, the nib may be configured to transfer one or more optical signals to the touch screen. For example, the nib may include or more fiber optic cables that transfer one or more input signals the touch screen.

Turning now to the figures, a communication system including a computing device and an input device will be discussed in more detail. FIG. 1 is a perspective view of an input system 100 including an stylus 104 in communication with a computing device 102 through a touch screen 106. The computing device 102 may be substantially any type of electronic device and may include a capacitive input mechanism, such as the touch screen 106 or other touch interface. For example, the computing device 102 may be a laptop computing device, a tablet computing device, a smartphone, a digital music player, portable gaming station, or the like. Although not shown, the computing device 102 may include one or more components of a typical electronic or computing device, such as one or more processing components, to provide control or provide other functions for the device 102. Some illustrative components for operating and communicating with the touch screen 106 are discussed in more detail below with respect to FIG. 4.

The computing device 102 may include the touch screen 106, an enclosure 110, one or more input buttons 108, and/or additional functionality, components and elements. The enclosure 110 encloses one or more components of the computing device 102, as well as may surround and/or secure a portion of the touch screen 106 to the computing device 102. The one or more input buttons 108 may provide input functions to the computing device 102. For example, the input buttons 108 may adjust a volume for the computing device 102, turn the computing device 102 on or off, or may provide other inputs for the computing device 102. Further, the computing device 100 may also include one or more receiving ports 112. The receiving ports 112 may receive one or more plugs or connectors, such as but not limited to, a universal serial bus (USB) cable, a tip ring sleeve connector, or the like.

The Touch Screen

Figure 2:
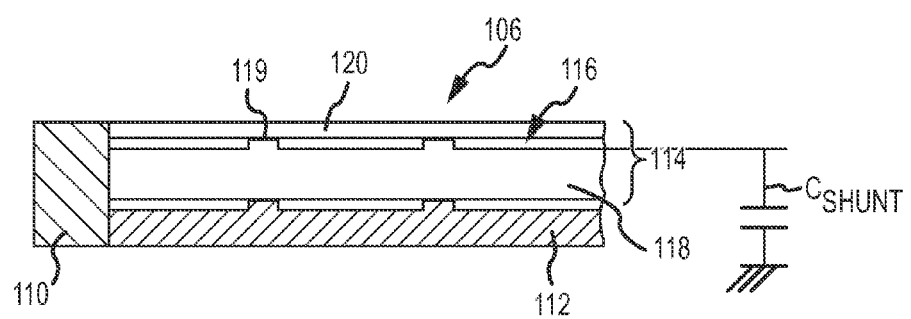
FIG. 2 is a cross-section view of a touch screen of the computing device taken along line 2-2 in FIG. 1.

The touch screen 106 may include one or more sensors in order to detect one or more input signals based on user touches and/or inputs from the stylus. Additionally, the touch screen 106 may include a display screen to provide a graphical user interface, and depict video and/or image output for the computing device 102. FIG. 2 is a cross-section view of the touch screen 106 taken along line 2-2 in FIG. 1. The touch screen 106 is configured to receive inputs from an object (e.g., location information based on a user's finger or data from the input device) and to send this information to a processor. The touch screen 106 may report touches to one or more processors and the processor may interpret the touch(es) in accordance with its programming. For example, the processor may initiate a task in response to a particular touch. The touch screen 106 may include a display screen 112 and a sensor panel 114 positioned at least partially over the display screen 112. The display screen 112 is configured to display one or more output images and/or videos for the computing device 102. The display screen 112 may be substantially any type of display mechanism, such as a liquid crystal display (LCD), plasma display, light emitting diode (LED) display, organic LED display and the like. In instances where the display screen 112 is a LCD display, the display screen 112 may include (not shown) various layers such a fluorescent panel, one or more polarizing filters, a layer of liquid crystal cells, a color filter, or the like. It should be noted that FIG. 2 is not drawn to scale and is a schematic view of the touch screen.

The sensor panel 114 may include an electrode layer 116 operably connected to a sensor glass 118 or other type of support structure. The electrodes 116 may be connected to one or both sides of the sensor glass 118. As one example, the electrodes 116 may be positioned on a first side of the sensor glass 118, and the other side of the glass may be coated to form a ground shield. As another example, the sensor glass 118 may be formed of multiple layers of polyethylene terephthalate (PET), with each layer including electrodes 116 operably connected to one side of the layer. The layers may be stacked to form rows, columns, and/or shield layers.

With continued reference to FIG. 2, the sensor glass 118 may form a portion of the display screen 112 or may be separate therefrom. The sensor glass 118 may be a relatively clear element that may protect the display screen 112 from forces that may be exerted on the sensor panel 114 by a user or input device. In some embodiments, the sensor glass 118 may be a clear glass panel that may allow the display screen 112 to be viewable therethrough. The electrode layer 116 may include one or more electrodes which may be deposited on the sensor glass 118. For example, the electrode layer 116 may be formed of one or more suitable transparent conductive materials, such as indium-tin-oxide, and/or pattern techniques, such as deposition and printing. It should be noted that the electrode layer 116 may include a plurality of electrodes separated by gaps, where the electrodes are interconnected by one or more traces or other electrical elements. In an embodiment having in-plane drive rows and sense columns, a drive line may be segmented into multiple drive elements. Traces may run from each drive element or a row to a substrate, thereby interconnecting each drive element to form a row. Thus, vertically aligned drive elements may be separated from one another by guard columns and/or sense columns, but may continue to operate as a single drive row.

The electrode layer 116 may include at least one or two layers of electrodes which may be spaced apart across the layer 116. The electrodes, discussed in more detail with respect to FIG. 3, may define one or more nodes 144 that act as capacitive coupling sensors to detect touches on the touch screen 106. The number, spacing and configuration of the nodes 144 may be varied, depending on the desired sensitivity of the touch screen 106.

The touch screen 106 may also include a cover surface 120 disposed over the electrode layer 116. Thus, the electrode layer 116 may be substantially sandwiched between the cover surface 120 and the sensor glass 118. The cover surface 120 protects the other layers of the touch screen 106, while also acting to insulate the electrode layer 116 from external elements (such as fingers or input devices that may contact the cover surface 120). The cover surface 120 may generally be formed from substantially any suitable clear material, such as glass, sapphire or plastic. Additionally, typically the cover surface 120 is sufficiently thin to allow for sufficient electrode coupling between the electrode layer 118 and any external input objects (e.g., fingers, input devices). For example, the cover surface 120 may have a thickness ranging between 0.3 to 2 mm.

It should be noted that, in some embodiments, the touch screen 106 may be substantially any type of touch interface. For example, the touch interface may not be see-through and/or may not correspond to a display screen. In these instances, a particular surface or group of surfaces may be configured to receive touch inputs, that may or may not correspond to a separately displayed user interface, icons, or the like. The touch screen may take the form of a touch pad or track pad in some embodiments, or a touch-sensitive surface on an input device.

Figure 3:
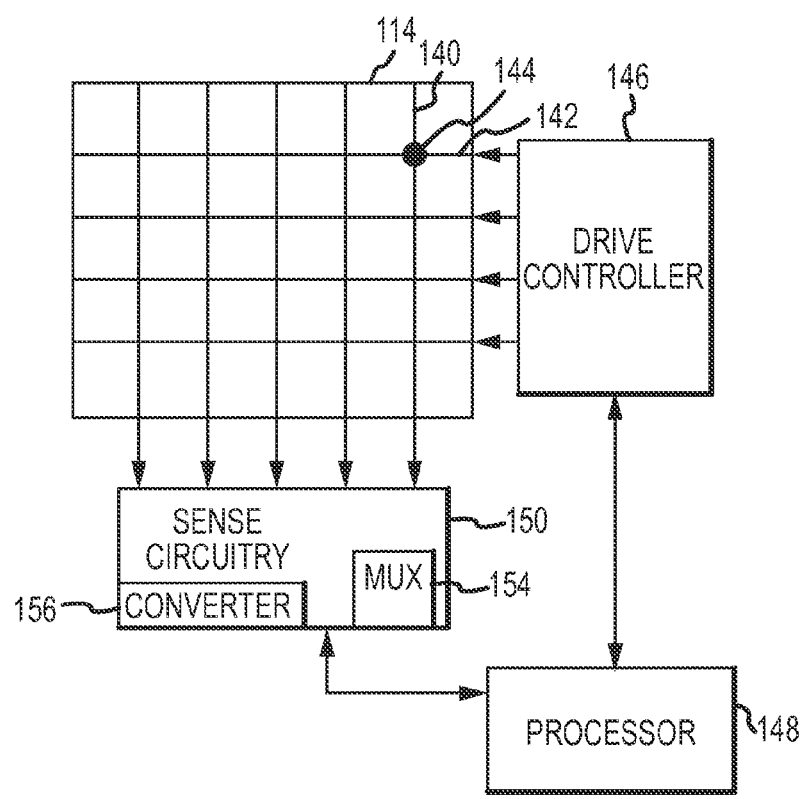
FIG. 3 is a block diagram of the computing device of FIG. 1.

Operation of the touch screen 106 will now be discussed in more detail. FIG. 3 is an illustrative block diagram of the computing device 102 and touch screen 106. The sensor panel 114 of the touch screen 106 may be configured to detect touches on the surface of the touch screen 106 by changes in capacitance. Typically when two electrically conductive members come close to one another, without actually touching, their electric fields interact to form a capacitance. With reference to FIG. 3, a sensing node 144 formed by one or more electrodes (explained below) may form a first electrically conductive member and an object, such as a finger of the user, may form a second electrically conductive member. The sensor panel 114 of the touch screen 106 may be configured as in a self capacitance arrangement or in a mutual capacitance arrangement.

In the self capacitance arrangement, the electrode layer 116 may include a single layer of a plurality of electrodes spaced in a grid or other coordinate system (e.g., Polar) where each electrode may form a node 144. The sensing circuit 150 monitors changes in capacitance that may occur at each node 144, which typically occurs at a node 144 when a user places an object (e.g., finger or nib 122 of the stylus 104) in close proximity to the electrode.

With continued reference to FIG. 3, in a mutual capacitance system, the electrode layer 116 may include electrodes separated into two layers forming drive lines 142 and sense lines 140. The drive lines 142 may be formed on a first layer of the electrode layer 116 and the sense lines 140 may be formed on a second layer of the electrode layer 116. The nodes 144 for the sensor panel 114 may be defined at locations of the electrode layer 116 where the drive lines 142 may cross the sense lines 140 (although in different layers). The sense lines 140 may intersect the drive lines 142 in a variety of manners. For example, in one embodiment, the sense lines 140 are perpendicular to the drive lines 142, thus forming nodes 144 with x and y coordinates. However, other coordinate systems can also be used, and the coordinates of the nodes 144 may be differently defined.

A drive controller 146 is connected to each of the drive lines 142. The drive controller 146 provides a stimulation signal (e.g., voltage) to the drive lines 142. The sensing circuit 150 is connected to each of the sense lines 140 and the sensing circuit 150 acts to detect changes in capacitance at the nodes 144. During operation, the stimulation signal is applied to the drive lines 142 and due to the capacitive coupling between the drive lines 142 and sensing rows 140, a current is carried through to the sense lines 140 at each of the nodes 144. The sensing circuit 150 then monitors changes in capacitance at each of the nodes 144. As with the self-capacitance, a change in capacitance at each of the nodes 144 typically occurs when a user places an object such as a finger in close proximity to the node 144 as the object typically steals a charge, affecting the capacitance of the node 144.

In a specific embodiment, each drive line 140 may be driven separately or in groups, such that the drive controller 146 may selectively apply the stimulation signal to drive lines 140. Each drive line 140 or bank of drive lines may be driven sequentially until the entire set of drive lines 140 has been driven. Although the drive lines 140 are driven individually or in groups, the sensing circuit 150 may sense changes of capacitance along all of the sense lines 142 in parallel. In this manner, the coordinates of a touch node 144 may be more easily determined.

In some embodiments, the drive and sense lines may be co-planar rather than on different planes. Likewise, an associated array of RGB pixels may be co-planar with the drive and sense lines, such that the touch screen 106 is in plane with the display pixels.

In either the self-capacitance or mutual capacitance arrangements discussed above, the sensing circuit 150 can detect changes in capacitance at each node 144. This may allow the sensing circuit 150 to determine when and where a user or the stylus 104 has touched various surfaces of the touch screen 106 with one or more objects. The sensing circuit 150 may include one more sensors for each of the sense lines 142 and may then communicate data to a processor 148. In one example, the sensing circuit 150 may convert the analog capacitive signals to digital data and then transmit the digital data to the processor 148. In other examples, the sensing circuit 150 may transmit the analog capacitance signals to the processor 148, which may then convert the data to a digital form. Further, it should be noted that the sensing circuit 150 may include individual sensors for each sensing line 142 or a single sensor for all of the sense lines 142. The sensing circuit 150 may report a location of the node 144, as well as the intensity of the capacitance (or changed thereof) at the node 144.

With reference to FIG. 4, the sensing circuit 150 may also include a multiplexer 154. The multiplexer 154 may be configured to perform time multiplexing for the sense lines 142. For example, the sensing circuit 150 may receive signals from each of the nodes 144 along the sense lines 142 at approximately the same time, the multiplexer 154 stores the incoming signals and then may release the signals sequentially to the processor 148 one at a time.

The sensing circuit 150 may also include a converter 156. The converter 156 transforms signals from a first signal to a second signal. For example, the converter 156 may transform analog signals to digital signals. As specific example, the converter 156 may receive voltage signals from the sense lines 142 which may vary based on the amount of capacitive coupling at each of the nodes 144 and may transform those voltage signals into digital signals.

In some instances, the capacitive coupling for the touch screen 106, and specifically the electrode layer 116, may be determined by the physical geometry of the touch screen 106 and the object communicating with the touch screen 106. Thus, as will be discussed in more detail below, as the portion of the nib in communication with the touch screen varies, so may the input signals as sensed by the touch screen.

The Input Device

Figure 4A:
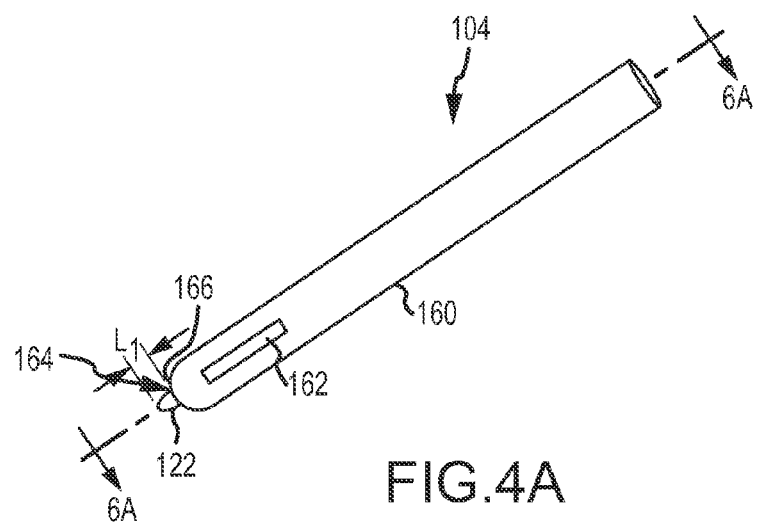
FIG. 4A is a cross-section view of the input device with a nib extended to a first length.
Figure 4B:
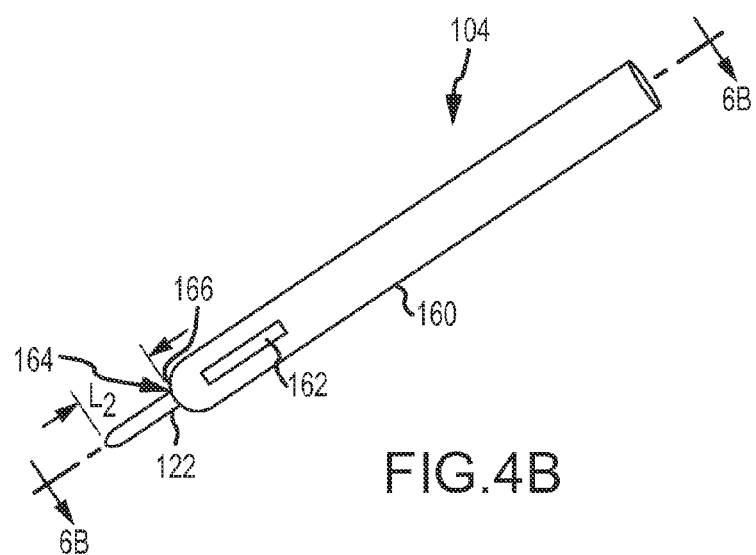
FIG. 4B is a cross-section view of the input device with the nib extended to a second length.

Turning now to FIGS. 4A and 4B, a first example of the stylus 104 will be discussed in more detail. FIG. 4A is a perspective view of the stylus 104 with the nib 122 extended to a first length. FIG. 4B is a perspective view of the stylus 104 with the nib 122 extended to a second length. The stylus 104 may include a body 160 or enclosure that may at least partially enclose the nib 122, as well as one or more components of the stylus 104. The nib 122 may extend through a nib aperture 164 defined on a first end 166 of the stylus 104.

The nib 122 may be a generally flexible material that may deform upon pressure and resiliently return to an original shape. The nib 122 may be made of a metal such as aluminum, brass or steel, as well as conductive rubber, plastic and other materials doped with conductive particles. In one embodiment the nib 122 may be Mylar, which may have sufficient conductive particles to interact with the touch screen, but may also be flexible. The nib 122 may be configured to be slid or traced along the surface of the touch screen 106 to interact therewith. For example, the nib 122 may be a conductive material, or another material laced with a conductive material, in order to may interact with the touch screen 106 and specifically one or more electrode layers (discussed below) to provide input to the computing device 102. In some embodiments, the nib 122 may be configured to vary an electrical parameter, such as a capacitance, at one or more of the nodes 144 of the touch screen 106, which may provide an input to the touch screen 106. For example, as the nib 122 contacts the surface of the touch screen 106, the touch screen 106 may receive a touch input. As will be discussed in more detail below, as the portions of the nib 122 that interact with the touch screen 106 increase, two or more nodes 144 may sense the presence of the stylus 104. This may allow the touch screen 106 to detect a general thickness, length, or width of the exposed nib, as discussed in more detail below.

The stylus 104 may further include an actuator 162 operably connected to the nib 122 and accessible through the body 160 or connected to an outer surface thereof. The actuator 162 may be used to vary an exposed length of the nib 122. For example, in FIG. 4A, when the actuator 162 is in a first position the nib 122 may have a first extension length L1 relative to the first end 164, whereas in FIG. 4B, when the actuator 162 is in a second position, the nib 122 may have an extension length L2 relative to the first end 164. In these embodiments, the actuator 162 may be a slide or switch that may be selectively movable by a user. As the actuator 162 varies in its position along a length and/or width of the stylus 104, the nib may move correspondingly. It should be noted that although the actuator 162 is shown in FIGS. 4A and 4B as a switch or slide button, other actuators are envisioned. For example, the actuator 162 may be other mechanical components, such as a compressible button, a rotatable collar or member, or the like. In these embodiments, the body 160 may include one or more components that may function as a track, travel surface, or other guide for the actuator 164. The actuator 164 may thus control the shape formed by the nib as its individual elements extend, in some embodiments. The actuator may be configurable to permit a user to select from a variety of shapes formed by the extended elements of the nib. For example, the actuator may include a collar or other element that may be configured between two different shapes. One shape may be a slit, so that the elements of the nib extend to form a fan. A second shape may be round, so that the elements of the nib extend to form a round brush.

As another example, the actuator 162 may be one or more electrical components or switches, such as a sensor coupled to a motor or other element that may change the extension length of the nib in response to a sensed user input.

Figure 5:
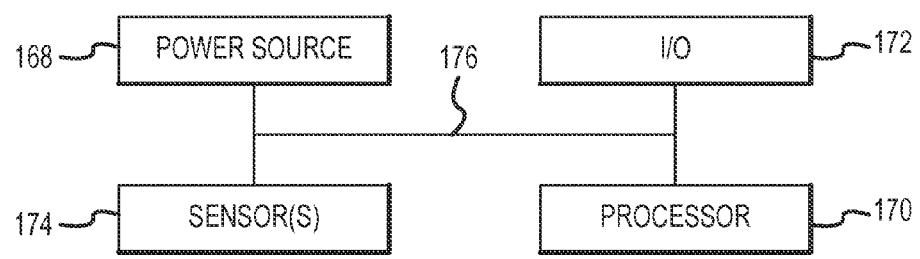
FIG. 5 is a simplified block diagram of the input device.

The stylus 104 may also include one or more control and/or internal components. FIG. 5 is a simplified block diagram of the stylus 104. With reference to FIG. 5, the stylus 104 may include a power source 168, a processor 170, an input/output interface 172, and/or one or more sensor 174. The electrical components of the stylus 104 may be in communication through one or more buses 176.

The power source 168 may provide power to one or more components of the stylus 104. The power source 168 may be a portable power source, such as a battery, or may be a wired power source, such as a communication cord that may be configured to transfer power to the stylus 104 from an external component.

The processor 170 may control select functions of the stylus 104. In some embodiments, the processor 170 may determine one or more input signals that may be transmitted through the nib 122 to the touch screen 106 and/or computing device 102. For example, as will be discussed in more detail below, the stylus 104 may communicate signals through the nib 122 to the touch screen, or through a back channel communication pathway, or the like, and in these instances, the processor 170 may control the signals transmitted from the stylus 104.

Optionally, the stylus 104 may also include an input/output (I/O) interface 172. The I/O interface 172 may receive and/or transmit one or more signals to and from the stylus 104, in addition to the optional transmission function of the nib. For example, the I/O interface 172 may receive one or more radio signals (e.g., Bluetooth), or may be configured to receive one or more electrical (digital and/or analog) signals transmitted from the computing device 102. In the latter example, the I/O interface 172 may be used in conjunction with the nib 122 to transmit and/or receive signals from the touch screen 106. For example, the I/O interface 172 may be configured to receive one or more voltage signals from the touch screen 106 (e.g., through the drive lines, discussed in more detail below). Additionally, the I/O interface 172 may include a voltage source in order transmit (optionally via the nib 122) one or more signals to the touch screen 106 and/or computing device 102.

With continued reference to FIG. 2, the stylus 104 may also include one more sensors 174. In some instances the sensors 174 may be configured to detect one more stimuli of, or received by the nib 122, the body 160, and/or other areas of the stylus 104. For example, the one more sensors 174 may include an accelerometer, a gyroscope, a pressure sensor, a force sensor, and so on. In these instances, the sensors 174 may be configured to detect changes in the angle of the stylus 104, a force exerted on the nib 122, a force exerted on the barrel or body of the stylus, and so on. With reference to FIGS. 4A-5, a sensor may be used to determine a position of the nib 122 with respect to first end 164 of the stylus 104, that is, an extension length of the nib 122. For example, the sensor 174 may be a circuit or electrical component that may be configured to detect a voltage or other characteristic of a voltage divider or potentiometer.

Figure 6A:
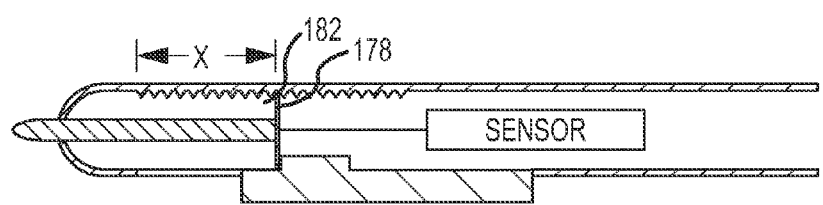
FIG. 6A is a partial cross-section view of the input device taken along line 6A-6A in FIG. 4A.
Figure 6B:
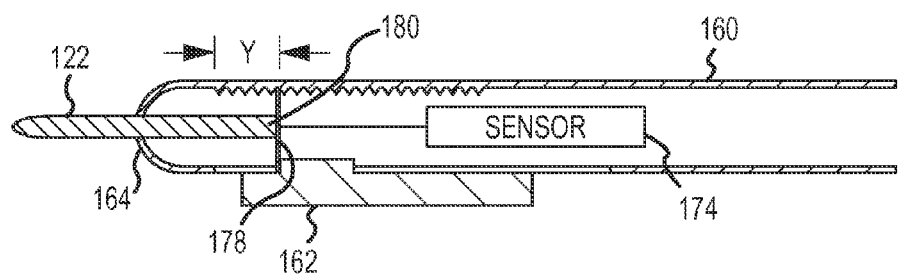
FIG. 6B is a partial cross-section view of the input device taken along line 6B-6B in FIG. 4B.

An illustrative embodiment of the stylus 104 including a sensor 174 configured to detect a voltage signal corresponding to a nib position will now be discussed. FIG. 6A is a cross-section view of the stylus taken along line 6A-6A in FIG. 4A. FIG. 6B is a cross-section view of the stylus taken along line 6B-6B in FIG. 4B. With reference to FIGS. 6A and 6B, the sensor 174 may be in communication with a voltage divider, such as a potentiometer. In this example, as the actuator 178 changes a position of the nib 122 with respect to the body 160 of the stylus 104, a wiper 178 operably connected to an end 180 of the nib 122 may change location along a restive element 182. For example, as the actuator 162 moves the nib 122 along a length of the body 160 of the stylus 104, the actuator 162 may also move the wiper 178.

The wiper 178 or other conductive element may be in communication with the sensor 170, which in this case may be configured to sense a change in voltage. As the position of the wiper 178 changes along the resistive element 182, the sensor 170 may sense varying voltages. However, it should be noted that other parameters may be used to determine the location of the nib relative to the body of the stylus, and a voltage input is only a single example.

With reference to FIG. 6A, when the nib 122 is partially exposed or has the first extension length L1, the wiper 182 may be positioned a distance of X along the restive element 178. This may produce a first resistance, which may vary a voltage signal applied across the resistive element 178 as measured at the wiper location. With reference to FIG. 6B, when the nib 122 has a second extension length L2, the wiper 178 may be positioned at a distance of Y along the resistive element 178. The distance of the wiper 178 may thus correspond to the position of the nib 122, and may vary the voltage signal sensed by the sensor 174. In these embodiments, the stylus 104 may be able to determine the extension length of the nib 122. This may allow the stylus 104 to transfer this data to the touch screen separately (e.g., through a back channel communication path or the like), which may be used to provide varying outputs by the touch screen. For example, a first extension length may represent a first output color, whereas a second extension length may represent a second output color. As a second example, the different output lengths may be provided to the computing device 102 (in addition to being detectable through the touch screen) to provide redundant data regarding the nib 122.

Figure 7A:
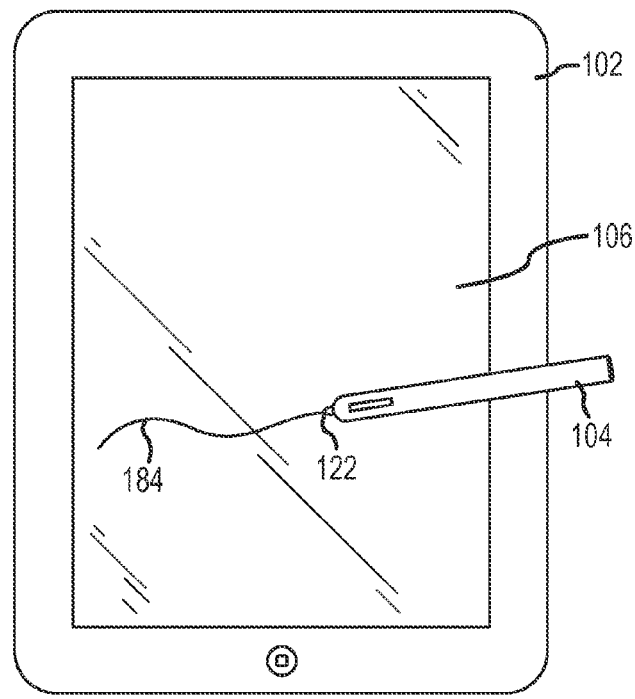
FIG. 7A is a top plan view of the computing device receiving an input from the input device with the nib extended to the first length.

As briefly discussed above, as the nib 122 extension varies, the portions of the nib 122 that are in communication with the touch screen 106 may correspondingly increase or decrease. As the portions of the nib 122 in communication with the touch screen 106 vary, the touch screen 106 may detect a varying input signal from the stylus 104. FIG. 7A is a top plan view of the computing device 102 receiving an input from the stylus 104 with the nib 122 having the first extension. With reference to FIGS. 4A and 7A, the nib 122 may have a relatively small contact point with the touch screen 106, such as a point contact. This is because, the extension length L1 of the nib 122 may be small, so that the nib 122 may not be able to substantially bend or flex. In other words, the body 160 may surround a substantial portion of the nib 122 so as to prevent the nib 122 from bending or flexing, and as such only the tip or exposed end of the nib 122 may contact the touch screen 106.

As shown in FIG. 7A, the small contact area of nib 122 when mostly retracted into the stylus 104 may result in a first line 184 output by the computing device 102. The first line 184 may have a first width or thickness that may be configured to correspond to the portion of the nib 122 in contact with the touch screen 106. However, as the length of the exposed portion of the nib varies, the output by the computing device may also vary.

Figure 7B:
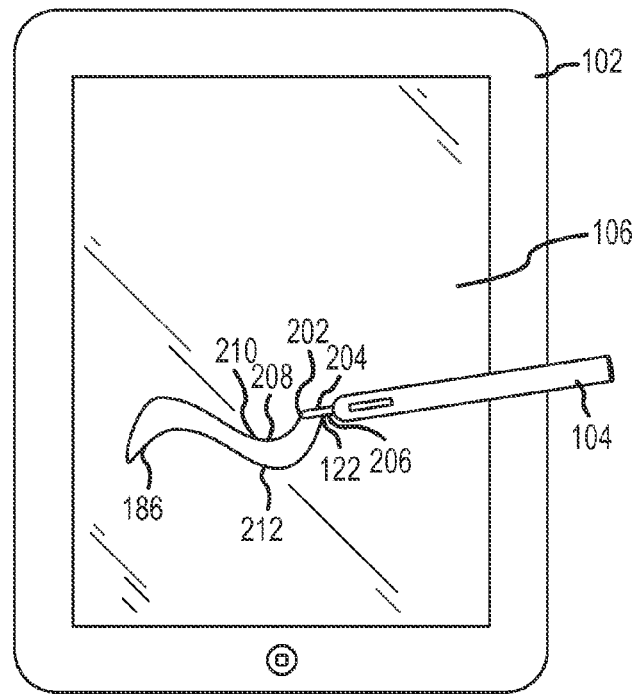
FIG. 7B is a top plan view of the computing device receiving an input from the input device with the nib extended to the second length.

As the extension of the nib changes, the stylus may provide additional input signals to the touch screen. FIG. 7B is a top plan view of the computing device 102 receiving an input from the stylus 104 with the nib 122 having the second extension length L2. With reference to FIGS. 4B and 7B, as the user presses on the stylus 104, the nib 122 may bend or flex such that a larger portion of the nib 122 may be in contact with the touch screen 106. Specifically, the nib 122 body may bend under the user force and may create a "L" shape or other curved shape where more than the tip of the nib 122 may be in contact with the touch screen. For example, a length of nib 122 along a first side may be in contact with the touch screen to interact with a plurality of nodes 144. This may provide an output line 186 that may have a larger thickness than the first output line 174 corresponding to the first extension length.

Figure 8:
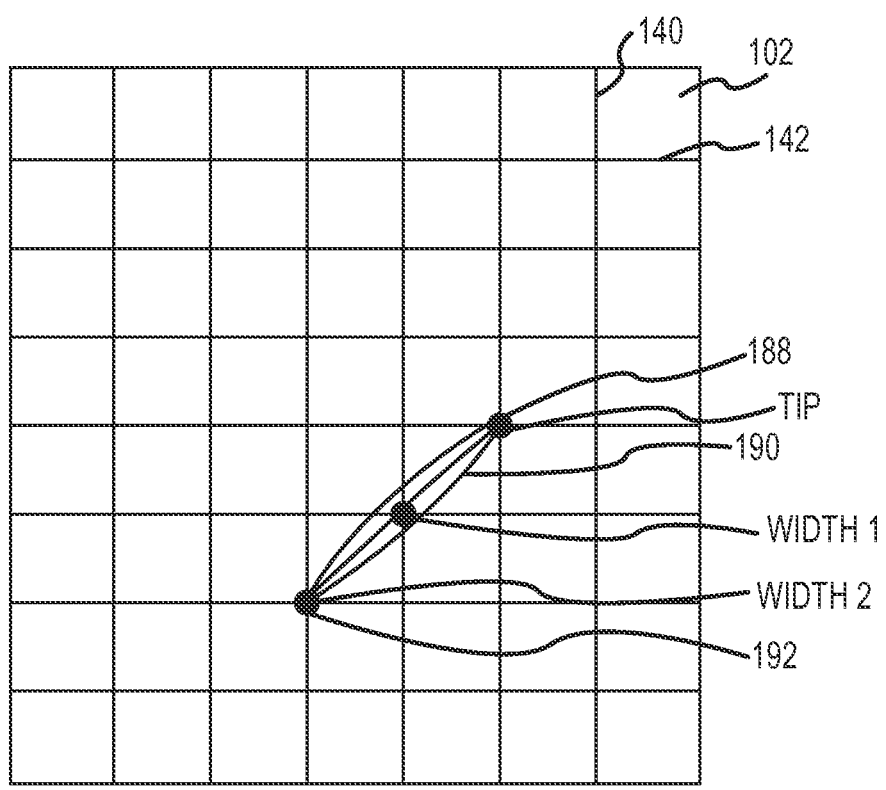
FIG. 8 is a simplified schematic of the nib extended to the second length interacting with the touch screen.

As the percentage of the nib 122 that interacts with the touch screen 106 varies, the nib 122 may contact more or fewer nodes of the touch screen. FIG. 8 is a simplified schematic of the nib 122 having the second extension length L2 interact with the touch screen 106. In this example, the first end 202 of the nib 122 may interact with a first node 188, a middle portion 204 of the nib 122 may interact with a second node 190, and a third or second end 206 of the nib 122 may interact with a third node 192. Due to the conductivity of the nib 122 material, the various portions of the nib 122 may cause a variation in a parameter at each of the nodes 188, 190, 192. For example, in capacitive touch screen, the nib 122 portions may vary a capacitance at each node 188, 190, 192. The variations in capacitance may be detected similar to the variations due to a user's finger, and may be correlated to one or more functions or commands.

Referring to FIGS. 7B and 8, the first end 202 of the nib 122 may be correlated to the top edge 208 of the output line 186, the middle portion 204 of the nib 122 may be correlated to the middle 210 of the output line 186, and the second end 206 of the nib 122 may be correlated to the bottom edge 210 of the output line 186. As more of the nib 122 is exposed, more nodes 144 may be in communication with the nib 122, which may vary the width of the output line or other output associated with the stylus.

In some instances, the sides and other surfaces of the nib 122 may be used in addition to or instead of the tip of the nib to provide input to the touch screen 106. This may allow the stylus 104 to use nib-side interactions with the touch screen to provide a first input, as well as nib-tip interactions with the touch screen to provide a second input. These interactions may provide an enhanced user experience, as varying pressure, angle, and/or gestures with the input device 104 on the touch screen may result in varying outputs displayed on the device.

Although the output lines 184, 186 are discussed herein as having varying thicknesses, in other embodiments, the output thickness may be the same, but the flexibility of the nib may provide an enhanced user experience, as the stylus may have a more realistic feel, such as a paintbrush feel. Alternatively, the outputs based on the nib extension may be otherwise varied, such as varying the output color, an input command to the computing device 102, and so on.

Alternative Example of the Input Device

In some embodiments, the nib of the input device may include two or more strands or bristles that may each separately interact with the touch screen. FIG. 9A is a perspective view of a second example of the input device with the nib having a plurality of strands. FIG. 9B is a perspective view of the input device of FIG. 9A with the nib in an extended position. With reference to FIGS. 9A and 9B, the input device 304 may be substantially similar to the input device 104, but the nib 322 may include a plurality of strands 368a-368n. Each strand 368a-368n may be operably connected to the body 360 of the input device 304, and may be selectively movable relative to a first end 366 of the stylus. For example, an actuator 362 may vary an exposed length of each strand 368a-38n, either individually or collectively, as they extend through a nib aperture 364 defined in the end 366 of the body 360.

In this example, the nib 322 and the corresponding strands 368a-368n may be a conductive material, such as Mylar, that may also be flexible. Alternatively or additionally, the strands may be optic fibers, or other materials that may optically transmit light therethrough.

In addition to the nib 322 including a plurality of strands, in the stylus 304 of FIGS. 9A and 9B, the actuator may be varied. In these embodiments, the actuator 362 may be a rotating member that may rotate relative to the body 360 of the stylus 360 in order to vary the exposed length of the nib 322. For example, the actuator 362 may be a rotatable collar that may rotate circumferentially around the body 360, and as the actuator 362 rotates the nib 322 may be retracted or extended. It should be noted that the actuator 362 may be used with the stylus 104 of FIGS. 4A and 4B and/or the actuator 162 of FIGS. 4A and 4B may be used with the stylus 304 of FIGS. 9A and 9B.

In instances where the actuator 362 may be the rotating collar member, the nib 322 may be connected to the actuator 362, and as the actuator 362 rotates it may move laterally along the length of the body 360. As the position of the actuator 362 along the body length varies, the position of the nib relative to the body may also vary, which may changed the exposed length of the nib 322. It should be noted that the stylus 304 may also include a sensor for detecting the position of the nib 322 relative to the end 366 of the stylus, the sensor may be substantially similar to the sensor discussed with respect to the stylus 104, or may be another component configured to detect a parameter that may be correlated to a position of the nib.

Figure 10A:
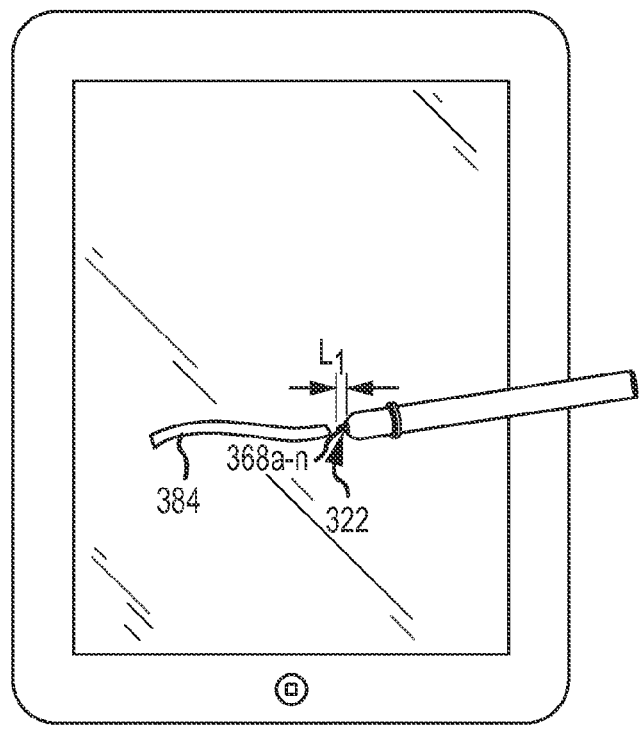
FIG. 10A is an example of the input device of FIG. 9A interacting with the touch screen.

With reference to FIG. 9A, in instances where the nib 322 may have a first extension length L1, the strands 368 may be compressed together as they extend from the nib aperture 364. In these instances, each strand may be sufficiently close to the other strands so that the stylus 304 may interact with the touch screen 106 in such a manner to produce a single or generally coherent output. FIG. 10A is an example of the nib 322 having the first extension length L1, and interacting with the touch screen. With reference to FIGS. 9A and 10A, the diameter of the nib aperture 264 may be correlated to a thickness of the output line 384, as the strands 368a-368n may be compressed together surrounded by the inner walls of the body defining the aperture.

With continued reference to FIGS. 9A and 10A, the strands 368a-368n may be substantially close together so that the nodes 144 of the touch screen 106 may sense only a single interaction therewith, and accordingly the individual strands may be sensed as a single input to the touch screen 106. This may produce the single line 384 shown in FIG. 10A. Of course, the output and sensed inputs may be varied by the variations in the sensitivity of the touch screen 106, so that the more sensitive the touch screen may be (such as having more nodes), the closer together the strands may have to be in order to be detected as a single input.

The exposed portion of the nib 322 may be varied to vary an input to the touch screen 106. With reference to FIG. 9B, the actuator 362 may be selectively actuated to vary the exposed length of the nib 322 from the first exposed length L1 to a second exposed length L2. As the nib 322 extends past the end 366 of the body 360, the strands 368a-368n may separate and extend away from each other. In other words, the strands may splay out as they extend from the stylus. As one example, the strands 368a-368n may form a fan shape as they extend from the end 366 of the stylus 304. As shown in FIG. 9B, each respective strand may be separated from adjacent strands by a spacing distance 370. The spacing distance 370 may correspond to the exposed or extension length of the nib 322. That is, the larger the exposed length of the nib 322, the larger the spacing distance 370.

Figure 10B:
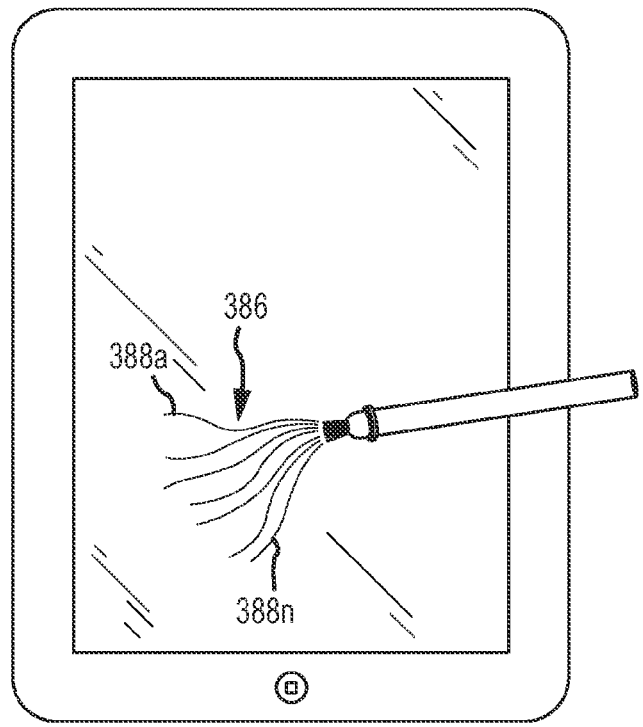
FIG. 10B is an example of the input device of FIG. 9B interacting with the touch screen.

As the strands 368a-368n of the nib 322 extend away from each other, the touch screen 106 may detect separate inputs correspond to each strand. FIG. 10B is a top plan view of the stylus 304 with the nib 322 in an extended position. As shown in FIG. 10B, an output graphic 386 corresponding to the input from the stylus 304 may include a plurality of strand lines 388a-388n, where each strand line may correspond to the sensed input from each strand 368a-368n. In these embodiments, the stands 368a-368n may be sufficiently separated to be individually detectable by the touch screen 106. That is, separate nodes may sense the presence of each strand.

Figure 11:
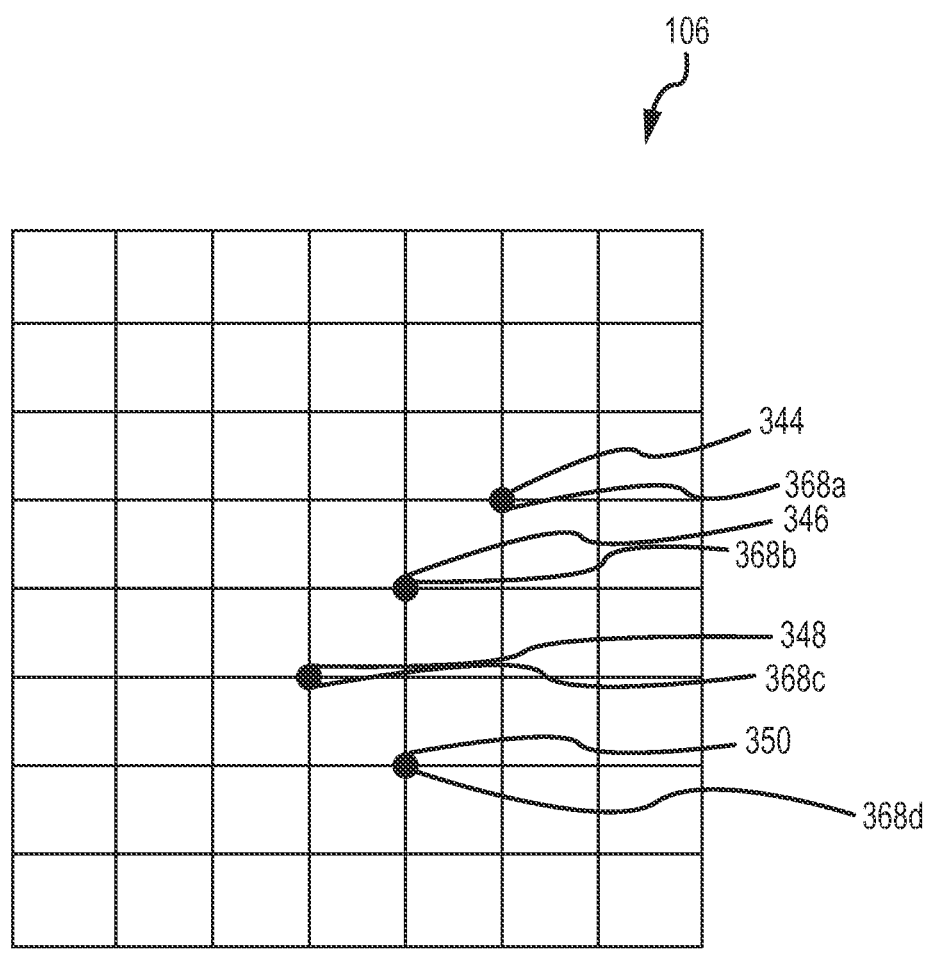
FIG. 11 is a top plan view of a schematic of the touch screen illustrating the nodes interacting with the nib illustrated in FIG. 10B.

The touch screen interaction for detecting the strands of the nib will now be discussed in more detail. FIG. 11 is a top plan view of a schematic of the touch screen 106 illustrating the nodes interacting with the nib 322 as shown in FIG. 10B. With reference to FIG. 11, in instances where the nib 322 is extended, each of the strands 368a-386n may interact with a different node or plurality nodes (e.g., in a manner similar to FIG. 8). For example, a first strand 368a may interact with a first node 344, a second strand 368b may interact with a second node 346, a third strand 368c may interact with a third node 348, a fourth strand 368d may interact with a fourth node 350, and so on. As each of the strands 368a-368n may be a conductive material, as they encounter the touch screen 106, the capacitance at each of the nodes may thus be altered, which may allow the touch screen to detect the input from the strands. It should be noted that the number of nodes which a particular set of strands may interact with may be determined by the spacing distance 370 between each strand, as well as the geometry of the touch screen. For example, the farther the distance between each stand and the increased number of nodes and position of nodes relative to each on the touch screen, the more individual strands that may be detected. However, in other examples, a particular node may detect two or more strands, although the nib 322 may be in an extended position. In these examples, the output lines may have a thickness that corresponds to a group of strands, rather than individual strands. This also may vary based on the thickness of each strand.

It should be noted that in some instances, each of the strands 368a-368n may also apply an input similar to the input illustrated in FIG. 7B. Specifically, the nib 322 of the stylus 304 may be sufficiently flexible that the user may apply pressure to bend the nib 322 to create a wider stroke, in addition to or instead of the fanning stroke illustrated in FIG. 9B. Moreover, although the strands 368a-368n are illustrated as being extended and retracted in a group, in some embodiments, the strands may be individually movable or movable in subsets. For example, the user may selectively move an actuator to move one or more strands, such that the stylus 304 may vary from having a single strand exposed to having a two strands exposed, to having all of the strands exposed. In this manner, the exposed portion of the nib 322 may be dynamically variable based on the desires of the user, which may enhance the user experience, as well as provide the user an additional level of control for providing inputs to the touch screen 106.

The strands 368a-368n may be configured to be sufficiently sensitive to forces and/or variations in dimension that they may be used to trace a three-dimensional surface on a screen. For example, the strands may be brushed across a raised surface. The variance in height of the surface may be detected by the strands and this information may be transmitted to an associated computing device, permitting virtual reconstruction of the device by the system.

Alternative Nib Example

Figure 12:
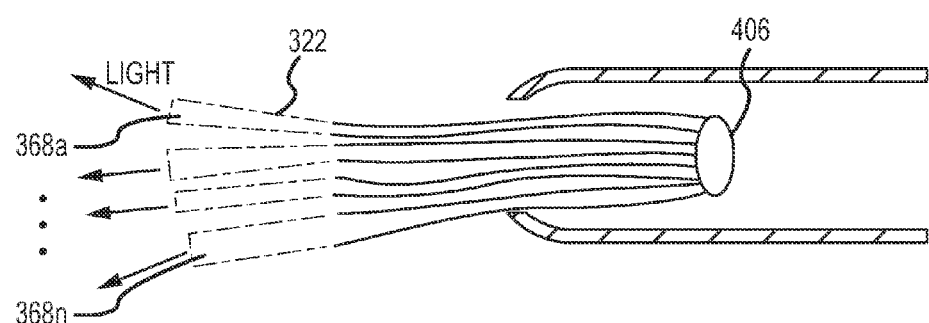
FIG. 12 is an enlarged simplified cross-section of the input device including a signal transmission mechanism.

In some embodiments, the nib may interact with the touch screen through a transmitted signal, in addition to alternatively to the capacitive coupling with the nodes 144. FIG. 12 is an enlarged simplified cross-section of the stylus 304 including a signal transmission mechanism. As shown in FIG. 12, the nib and/or strands may be one or more fiber optic cables and the stylus 304 may include a light emitting diode 406 (LED) or other light source that may be optically connected thereto. In this example, the LED 406 may transmit light signals, such as pulses, through the strands 368a-368n, and the strands may communicate these signals to the touch screen 106.

In this embodiment, the touch screen 106 or other display may include one or more sensors that may be used to detect the signals from the stylus 304. As one example, the touch screen may include one or more optical sensors, such as cameras or other optical elements that may be used to capture the signals transmitted by the nib 322. As another example, one or more pixels in the display screen 112 may be used as optical or light sensors to sense the light signals from the stylus 304. In this example, the display screen 112 may include a plurality of pixels that may be used to provide a visual output corresponding to one or more colors. During an off-flicker time period (e.g., as the pixels are refreshing between frames), the pixels may have a residual charge from the previous frame and may be configured to receive the signals from the stylus 304. As the light hits the pixels, the pixels may transmit the signals to the one or more processing components which may use the input signals as desired.

In these embodiments, select wavelengths, such as select colors, may represent certain signals. Alternatively or additionally, the touch screen may be configured to receive only a select color or wavelength signal. In these instances, the touch screen may be configured to interact with only with select stylus devices, which may act as a security setting for the device.

In another embodiment, the converse of the above may be implemented. That is, the input device 304 may include a light sensor that is operably connected to one or more of the nib strands 368. The nib strands may be fiber optic or otherwise made of a light transmissive material, such that colors adjacent the ends of the strands may be registered by the light sensor within the input device. In this fashion, a touch screen or other display may employ light to communicate commands, data or other information to the stylus; the light may be sensed by the internal light sensor and certain patterns, shades, hues, intensities and the like may be correlated to particular data for the stylus. As one example, such functionality may permit the stylus to function as a relatively inexpensive tool to calibrate colors on a display.

Further, a stylus having this functionality may facilitate color matching of real-world items, so that those colors may be used in an output associated with the stylus. As one example, the ends of a strand 368 may be placed next to a shirt. The color of the shirt may be sensed by the light sensor and a corresponding RGB value may be determined. That RGB value may be communicated from the input device to the associated computing device, so that outputs created by the action of the input device are shown in the aforementioned color. Essentially, any color may thus be sampled and reproduced as an output color in this fashion, and substantially any item may serve as the basis for this color sampling.

The light sensor need not be a visible light sensor only or exclusively. It may be an ultraviolet light sensor, infrared light sensor, and so on, either in addition to or in place of a standard color sensor. In addition, the light sensor may be paired with a light emitting source, such as a white LED, to facilitate color sampling by illuminating the surface to be color sampled.

It should be noted that other communication mechanisms may be used to allow the stylus to transfer data directly to the touch screen. Data transferred may include data relating to one or more sensors within the stylus (e.g., accelerometer, gyroscope, or force sensors), battery status, or the like. Some examples of communication may be a back channel communication channel through the touch screen or a digital communication transmitted as a voltage signal through the nib 322. An example of this second type of communication is discussed in more detail in the U.S. patent application Ser. No. 13/560,963 filed on Jul. 27, 2012 and entitled, "Device for Digital Communication through Capacitive Coupling."

CONCLUSION

The foregoing description has broad application. For example, while examples disclosed herein may focus on stylus embodiments, it should be appreciated that the concepts disclosed herein may equally apply to substantially any other type of input device. Similarly, although the input device and receiving unit may be discussed with touch screens, the devices and techniques disclosed herein are equally applicable to other types of capacitive coupling systems. Moreover, although the nib has been discussed herein as being extendable, the ideas discussed herein may be used with non-extendable nibs. Accordingly, the discussion of any embodiment is meant only to be exemplary and is not intended to suggest that the scope of the disclosure, including the claims, is limited to these examples.

What is claimed is:

1. An input device for producing output on computing devices comprising:
a body;
a nib movably coupled to the body, wherein the nib comprises a plurality of strands; and
an actuator operably connected to the body and the nib; wherein
the actuator moves the nib from a first position to a second position, wherein at least one characteristic of the output produced by the input device changes according to whether the nib is in the first position or the second position, and wherein the at least one characteristic is selected from the group consisting of different colors, thickness, and shapes that are not only a change in thickness; and
in the first position each of the plurality of strands in the nib has a first length extending from the body such that the input device provides a first input to the computing device and in the second position each of the plurality of strands in the nib has a second length extending from the body such that the input device provides a second input to the computing device.

2. The input device of claim 1, wherein the nib is a conductive material.

3. The input device of claim 2, wherein the nib is a flexible material and in the second position the nib bends when the user exerts a force on the body.

4. The input device of claim 1, wherein the nib is Mylar.

5. The input device of claim 1, wherein in the first position the strands have a first spacing distance relative to each other, and in the second position the strands have a second spacing distance relative to each other.

6. The input device of claim 1, wherein the actuator is a slide that traverses along a length of the body.

7. The input device of claim 1, wherein the actuator is a rotatable member that rotates relative to the body.

8. The input device of claim 1, wherein the actuator is a compressible button.

9. The input device of claim 1, further comprising a sensor, wherein the sensor is configured to determine a position of the nib relative to the body.

10. The input device of claim 1, further comprising an optical element, wherein the optical element is configured to transfer an optical signal through the nib to the computing device.

11. A stylus for providing an input to a touch interface of a computing device to produce an output on the computing device, comprising:
an elongated body;
a nib movably connected to the body;
an actuator operably connected to the nib and the body, wherein
the actuator varies of the nib that is exposed outside of the elongated body, wherein at least one characteristic of the output produced by the stylus changes according to the amount of the nib that is exposed outside of the elongated body, and wherein the at least one characteristic is selected from the group consisting of different colors, thickness, and shapes that are not only a change in thickness; and
wherein when the actuator is in a first position, a first amount of the nib is exposed outside of the elongated body to interact with the touch interface to provide a first input to the computing device, and wherein when the actuator is in a second position, a second amount of the nib is exposed outside of the elongated body to interact with the touch interface to provide a second input to the computing device.

12. The stylus of claim 11, wherein the nib comprises a plurality of strands.

13. The stylus of claim 12, wherein in a first position the plurality of strands are spaced adjacent one another and in a second position the plurality of strands are spaced apart from one another by a spacing distance.

14. The stylus of claim 13, wherein the stylus further comprises a light source, wherein the light source is in optical communication with the touch interface through at least one strand of plurality of strands.

15. The stylus of claim 14, wherein the plurality of strands are optical fibers.

16. The stylus of claim 11, wherein the actuator is a rotatable member, and in a first position the nib has a first extension length and in a second position the nib has a second extension length.

17. The stylus of claim 11, wherein as the actuator varies the amount of the nib exposed outside of the elongated body, a conductive surface of the nib interacting with the touch interface varies correspondingly.

18. The stylus of claim 11 wherein the first amount is a first surface area of the nib exposed outside of the elongated body and the second amount is a second surface area of the nib exposed outside of the elongated body.

* * * * *